United States Patent
Woodall et al.

(10) Patent No.: US 7,036,894 B1
(45) Date of Patent: May 2, 2006

(54) TANDEM DRIVE FOR TRACKED VEHICLES

(75) Inventors: Robert Woodall, Panama City Beach, FL (US); Felipe Garcia, Panama City, FL (US); Chris Doyle, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 93 days.

(21) Appl. No.: 10/768,751

(22) Filed: Jan. 29, 2004

(51) Int. Cl.
*B62D 55/18* (2006.01)

(52) U.S. Cl. ............................ 305/185; 305/33; 305/60; 180/9.1; 180/9.32; 180/9.42

(58) Field of Classification Search ................ 305/15, 305/33, 60, 185; 180/9, 9.1, 9.21, 9.32, 9.42
See application file for complete search history.

(56) References Cited

U.S. PATENT DOCUMENTS 1,068,563 A * 7/1913 Carr ............................ 305/19
2,416,679 A * 3/1947 Curtis ......................... 305/135
2,453,209 A * 11/1948 Dwight ........................ 305/33
2,541,177 A * 2/1951 Slemmons .................... 305/33

FOREIGN PATENT DOCUMENTS

| JP | 62-275880 | * 11/1987 |
| JP | 4-342678 | * 11/1992 |

* cited by examiner

*Primary Examiner*—Russell D. Stormer
(74) *Attorney, Agent, or Firm*—James T. Shepherd (57) ABSTRACT

A tandem track system and method provides for safe withdrawal of a tracked vehicle if either of the main tracks becomes separated. The tracked vehicle has a main track longitudinally extending in a closed endless main loop on opposite sides and engaging a separate main drive sprocket assembly, extending under roadwheels to a main drive idler wheel, and back to the main drive-sprocket assembly in the main loop. The tandem drive system has a secondary track engaging each main drive-sprocket assembly and extending forward along the track vehicle from each main drive-sprocket assembly under only an aft-most fractional portion of the roadwheels. The secondary track is configured as a closed endless secondary loop inside of the main loop of each main track whereby each secondary track can transfer rotary power to move the tracked vehicle to safety.

20 Claims, 5 Drawing Sheets

TANDEM DRIVE FOR TRACKED VEHICLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an improved track system for tracked vehicles. More particularly, this invention relates to a tandem drive system that assures continued operation of a tracked vehicle when either main track is broken or otherwise separated.

Military land forces traditionally use mechanical mine clearing devices, such as track-width mine plows, full-width mine plows, mine rollers, mine sweepers or mine flails to support the breaching and proofing of transit lanes through a minefield or mined roadway. Due to the weight and draft forces required to push these mine clearing devices, they are also traditionally attached to the front of a main battle tank or a supporting tracked vehicle.

The breaching process usually creates a primary cleared area of a transit lane directly in front of the tracks of the host vehicle pushing the clearing devices. Currently, these track-width plows and rollers are limited in their ability to clear large areas in front of the entire vehicle. Instead, they can only provide a marginal area of clearance to either side of the width of the host tank's track width. This limitation of clearance can be hazardous to the host vehicle.

Figure 1:
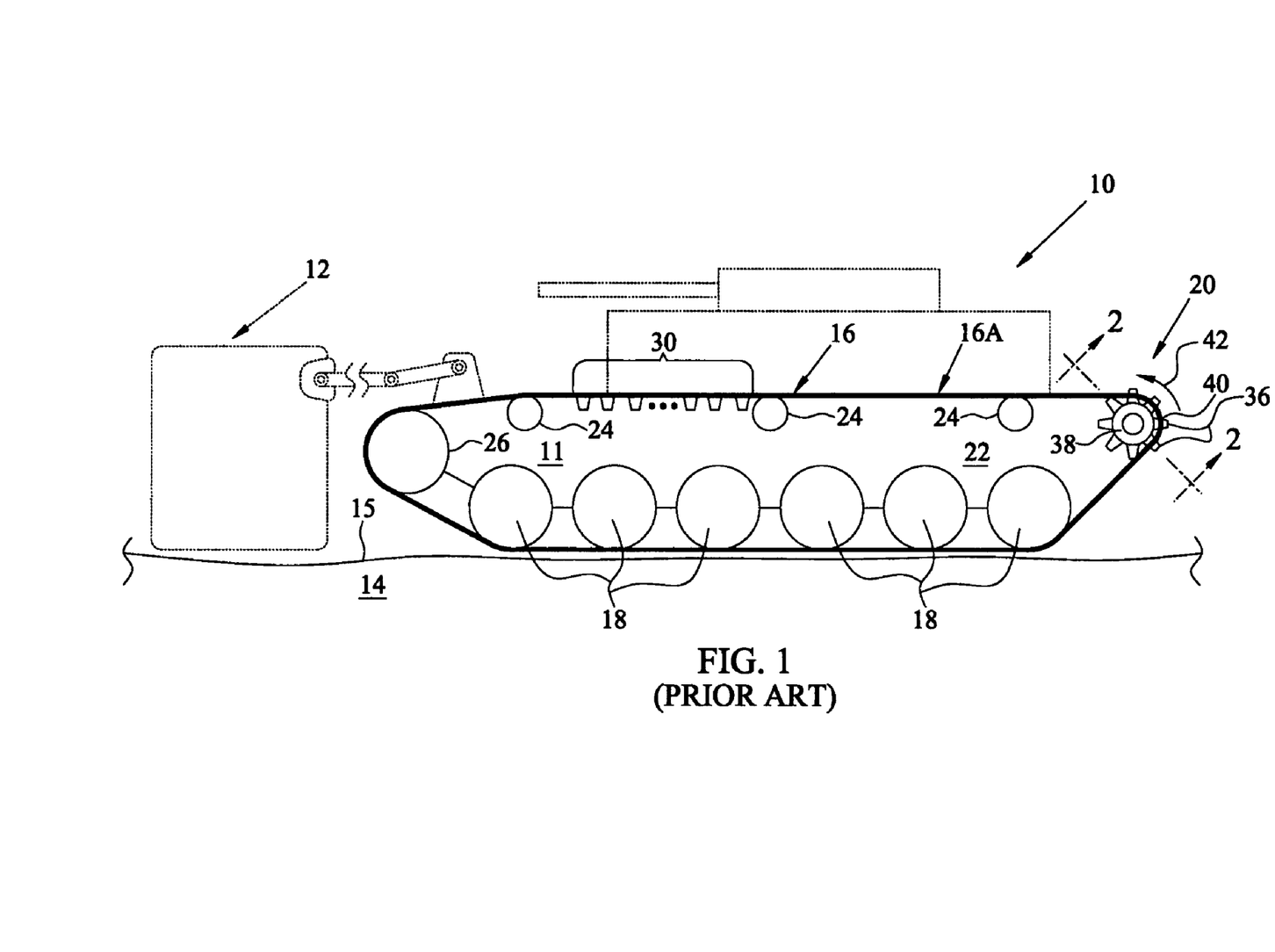
FIG. 1 is a schematic side view of a main battle tank or other tracked vehicle mounting a mine clearing device.

Referring to FIG. 1, a typical host vehicle 10 (a main battle tank or other tracked vehicle) is shown pushing a typical mine clearing device 12 over the ground 14 to clear a safe lane in a mined area or an area suspected of being mined. Mine clearing device 12 can be any of many different contemporary track-width mine plows, full-width mine plows, mine rollers, mine sweepers, or mine flails. Mine clearing device 12 can be pivotally mounted on host vehicle or main battle tank 10 so that it can be deployed by suitable hydraulic mechanisms at the surface 15 of ground 14 or raised up and held above it when device 12 is not needed.

Main battle tank 10 has a heavy steel, longitudinally extending main track 16 on each of its opposite lateral sides that transfers the weight of the vehicle through several roadwheels 18. Tank 10 achieves its high degree of maneuverability by mechanically engaging each main track 16 with a main drive-sprocket assembly 20 located on opposite lateral sides of and at the rear of hull 22 of tank 10 and applying or distributing the weight of tank 10 over the large surface areas of main tracks 16. FIG. 1 shows only one main track 16 longitudinally extending on one side of tank 10, it being understood that the other side of tank 10 also has a similarly disposed main track 16, roadwheels 18, and main drive-sprocket assembly 20 and other structure to be described below.

Each main track 16 is routed to extend forward on each side of tank 10 from its rear-mounted main drive sprocket assembly 20 and over a number of relatively smaller idler wheels 24. From smaller idler wheels 24 each main track 16 continues to extend to the front of hull 22 where it wraps around a larger main return-idler wheel 26 and extends downward and toward the rear of tank 10. Smaller idler wheels 24 support the weight and movement of each main track 16 between each main drive-sprocket assembly 20 and main return-idler wheel 26. More or less idler wheels 24 can be used on opposite sides of hull 22 than shown to support each main track 16.

After being routed around main return-idler wheel 26 each main track 16 extends under a series of supporting roadwheels 18 and back to each rear-mounted main drive-sprocket 22 where it is secured to itself to form a continuous, closed endless main loop 16A. Roadwheels 18 distribute the weight of the vehicle 10 to ground 14 via each main track 16 that is entrapped between roadwheels 18 and ground 14. The number and size of roadwheels 18 used to support main battle tank 10 can vary but can be as many as seven or more (per side of vehicle).

Figure 2:
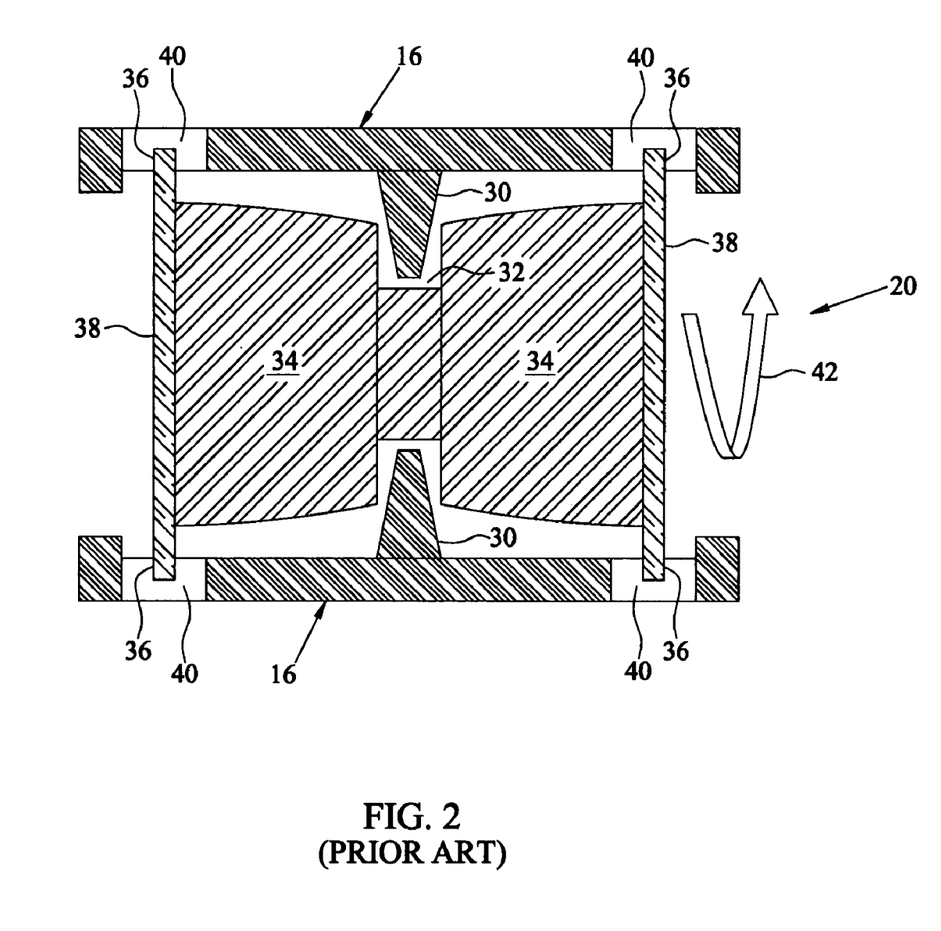
FIG. 2 is a schematic cross-sectional view of a rear-mounted main drive-sprocket taken generally along line 2—2 in FIG. 1 showing the main track being engaged by two drive sprockets and being retained by track center guide horns.

Referring also to FIG. 2, each main track 16 has equal-distantly, longitudinally spaced-apart, inwardly extending track center guide horns 30 that fit into an annular guide groove 32 in a hub 34 of each rear-mounted main drive-sprocket assembly 20. Only some of guide horns 30 are shown in FIG. 1, it being understood that guide horns 30 inwardly extend for the entire longitudinal length of each main track 16. Guide horns 30 in guide groove 32 help keep each main track 16 aligned so that gear teeth 36 of drive-sprockets 38 of each drive-sprocket assembly 20 can engage correspondingly spaced holes 40 in each main track 16 to deliver rotary power from machinery inside of tank 10. The rotary power (represented by arrow 42) is transmitted through rotated drive-sprocket assemblies 20 to tracks 16 for propulsion and maneuvering of tank 10. Each of smaller idler wheels 24, larger main return-idler wheel 26 and roadwheels 18 also has an annular guide groove (not shown) similar to each drive-sprocket assembly 20 to receive guide horns 30 and help retain each main track 16 on tank 10.

During mine clearing and mine proofing operations, mine clearing device 12 (either of or combinations of plows/sweepers/rollers) can become damaged by detonations of disrupted mines. However, irrespective of whatever clearing device is used, those lanes that have had the devices applied to them, are never considered to be 100% cleared of mines in some cases. When mine clearing device 12 is damaged, the mine detonation usually occurs at/under the first two sets of roadwheels 18 at the front 11 of tank 19 on the leading end portion of either main track 16, and usually induces separation and/or breakage of one or both of main tracks 16. This condition is usually categorized as a "mobility kill" since the crew members of the vehicle are not killed in the process but the mobility of the vehicle has been compromised. It is also of significance to note that detonations of mines occurring under tracked vehicles usually occur under their forward one-third sections since this is the portion of their tracks (and roadwheels) that first come in contact with explosive mines.

Any further movement of a track-damaged vehicle, whether forward or rearward causes the broken track to be pulled around rear-mounted main drive-sprocket assembly 20. This broken track can bunch-up and bind the vehicle's drive mechanism (drive-sprocket assemblies 20) while simultaneously causing the vehicle to steer out of the lane that was in the process of being cleared.

Often the operators of the tracked vehicles will attempt to back up and unbind the damaged track. Unfortunately, there is no force available to pull the damaged track back and it remains bunched on one side or the other around either or both main drive sprocket assemblies 20. This can cause the track-damaged vehicle to steer off-line and out of the cleared track path behind its mine clearing device 12 and expose the vehicle to further hazards of the minefield. This condition is caused by the fact that one track is broken while the unbroken track on the opposing side of the vehicle is still intact and fully functional. With only one functional track, the rearward moving vehicle will crab in a large radius path, in a direction towards the broken-track side.

When mine plows are used as mine clearing device 12, the only mines cleared can be those that are directly in front of the track-path of host vehicle 10. Following vehicles attempting to transit through this cleared lane must align their track or wheels to stay in this theoretically "cleared path". Additionally, since some of clearing devices 12 only clear mines from the track path, anyone trying to work on a damaged-track of a disabled vehicle while it is still inside the minefield cannot approach it from the side of the vehicle since that area has not been cleared of mines. The tracks can only be approached from the rear and thus they are extremely difficult if not impossible to safely work on and repair while the host tank 10 is immobilized in the minefield. Often, the damaged host tank 10 and its attached mine clearing device 12 have to be towed out of the lane or are temporarily abandoned. In either instance, the assault lane is blocked, thus preventing the movement of any combat vehicles through the minefield.

In most cases, a second tracked mine-clearing equipped vehicle can be brought in to create a 'safe-path' around the incapacitated vehicle, or a new transit lane is started to support the breaching operation. However, such options can be unduly wasteful in terms of both equipment and time, can significantly degrade the efficiency of transit of military hardware and troops, and can expose them to hostile fire by an adversary.

Thus, in accordance with this inventive concept, a need has been recognized in the state of the art for a track system having a tandem drive that assures continued operation of a tracked vehicle when the main track is broken or otherwise separated to provide the ability to maneuver in a mined area.

OBJECTS AND SUMMARY OF THE INVENTION

An object of the invention is to provide a track system having a tandem drive that assures continued operation of a tracked vehicle when a main track is broken or otherwise separated.

Another object of the invention is to provide a track system for a tracked mine clearing vehicle having a clearing device, such as a track-width mine plow, full-width mine plow, mine roller, mine sweeper or mine flail that assures continued operation of a tracked vehicle when a main track is broken or otherwise separated.

Another object of the invention is to provide a track system that allows a tracked vehicle to continue to operate without a main track binding if the main track becomes separated during use.

Another object of the invention is to provide a track system that allows the tracked vehicle to safely move forward and drop off a broken main track if the main track should become separated or broken.

Another object of the invention is to provide a track system that allows a tracked vehicle that has removed its primary tracks (i.e. under maintenance) to have a parking brake capability.

Another object of the invention is to provide a track system allowing a tracked, mine clearing vehicle having a clearing device, such as a track-width mine plow, full-width mine plow, mine roller, mine sweeper or mine flail to maintain its ability to maneuver clear (forward, to the side or rearward) of a mine cleared lane or area, when the main drive track becomes damaged to thereby not impede progress of other vehicles following it.

Another object of the invention is to provide a track system allowing a tracked mine clearing vehicle to continue to support expeditionary mine clearing operations (i.e. continue to plow forward) even after a mine has detonated under the front of the vehicle and has caused substantial structural damage to the primary track system and/or forward roadwheel assemblies.

Another object of the invention is to provide a track system assuring safe rearward egress of a tracked mine clearing vehicle from a minefield by allowing the vehicle to remain in the safe track path cleared of mines even after a mine has detonated under the front of the vehicle and has caused substantial structural damage to the primary track system and/or roadwheels.

Another object of the invention is to provide a track system providing a redundant path for vehicle propulsive power transfer to the ground.

These and other objects of the invention will become more readily apparent from the ensuing specification when taken in conjunction with the appended claims.

Accordingly, the present invention is for a tandem track system and method that provides for safe withdrawal of a tracked vehicle if either of the main tracks becomes separated. The tracked vehicle has a main track longitudinally extending in a closed endless main loop on opposite sides and engaging a separate main drive sprocket assembly, extending under roadwheels to a main drive idler wheel, and back to the main drive-sprocket assembly in the main loop. The tandem drive system has a secondary track engaging each main drive-sprocket assembly and extending forward along the track vehicle from each main drive-sprocket assembly under only an aft-most fractional portion of the roadwheels. The secondary track is configured as a closed endless secondary loop inside of and shorter than the main loop of each main track whereby each secondary track can transfer rotary power to move the tracked vehicle to safety.

DESCRIPTION OF THE PREFERRED EMBODIMENTS

Figure 3:
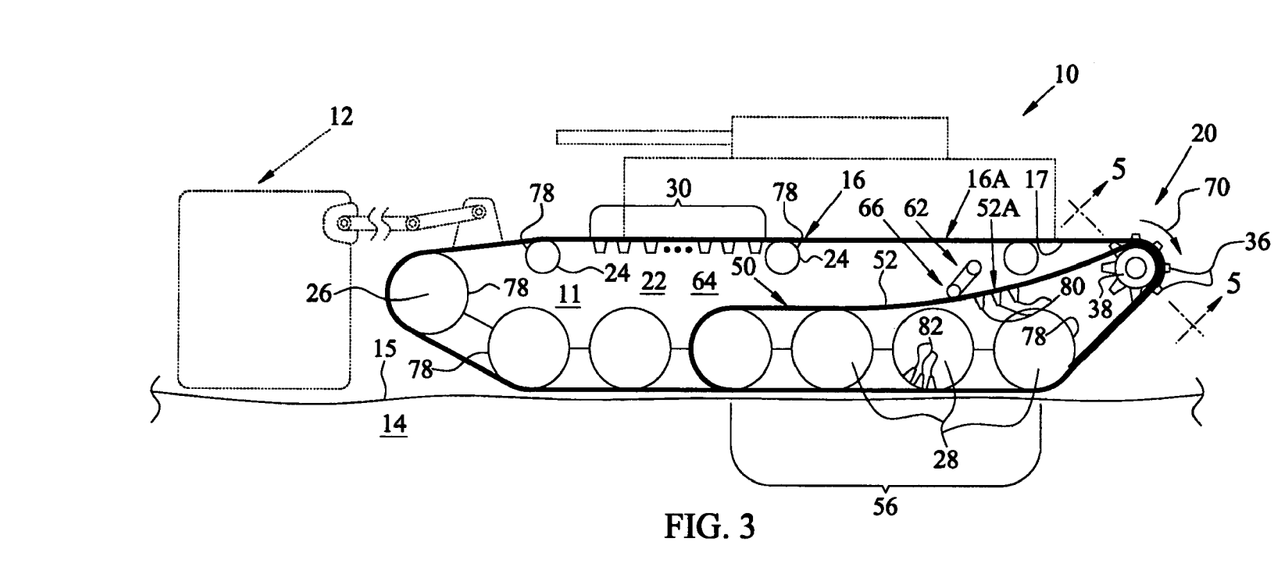
FIG. 3 is a simplified schematic side view of the tank of FIG. 1 including the tandem drive system of the invention.

Referring to FIG. 3, tank 10 has a tandem drive system 50 of the invention on each longitudinally extending lateral side of tank 10 next to and inside of a portion of each main track 16. Tandem drive system 50 solves many of the limitations of the previous art as noted above and has a secondary belt-drive track 52 that is placed inside of each of the heavier (usually steel) main track 16 that is used to propel and steer tank 10.

Each main track 16 extends back to a separate rear-mounted main drive-sprocket assembly 20 to propel and maneuver tank during normal operations, and each secondary track 52 extends back to a common rear-mounted main drive-sprocket 20 to propel and maneuver tank when an adjacent main track 16 becomes separated. Each secondary belt-drive track 52 is much shorter in length than each main track 16 and is placed adjacent to the inwardly facing inner surface or inboard face 17 of its associated main track 16 where both tracks 16, 52 are wrapped around each main drive-sprocket 20. Each secondary track 52 is thusly entrapped on inside face 17 of each main track 16, such that a single rear-mounted main drive-sprocket assembly 20 is driving two tracks 16 and 52 (i.e. Tandem-Drive).

Each secondary track 52 can be made in a continuous, closed endless secondary loop 52A from many well known combinations of proven materials and compositions that are strong and flexible to provide reliable long-term service. For example, each secondary track 52 can be broader forms of the fiber-reinforced belt-like structures used in the automotive industry to drive an alternator. The fiber reinforced, flexible belt-like structures of secondary tracks 52 can include a matrix of tough, flexible, and sufficiently wear-resistant rubber or other man-made compositions or composite materials having embedded, strong, stretch-limiting cords of nylon or the fibers marketed by Dupont Inc. under the trademark Kevlar. Many other combinations of fibers including metal and/or glass fibers and compatible tough binders will readily suggest themselves to one skilled in the art for fabrication of secondary tracks 52 by well-known techniques.

Each secondary track 52 extends forward along tank 10 from each rear main drive-sprocket assembly 20 and under several of an aft-most fractional portion 56 of supporting roadwheels 28 and back to drive-sprocket assembly 20 where it is connected to itself to form secondary loop 52A. This arrangement is in contrast to each main track 16 which is routed to extend from each rear-mounted main drive-sprocket assembly 20 all the way to the front of tank 10 under all roadwheels 28 and around main return-idler wheel 26.

Each secondary track 52 can extend forward under tank 10 under fewer or more of the aft-most located roadwheels 28 than the aft-most fractional portion 56 of four roadwheels 28 shown in FIG. 3 to accommodate different types of terrain or operational scenarios. Secondary track 52 extends under only the aft-most fractional portion 56 of roadwheels 28 since most explosions that damage tank tracks adversely affect or separate the part of main tracks 16 and roadwheels 28 that are under the forward part 11 of tank 10 and not where roadwheels 28 of aft-most fractional portion 56 are located.

Figure 4:
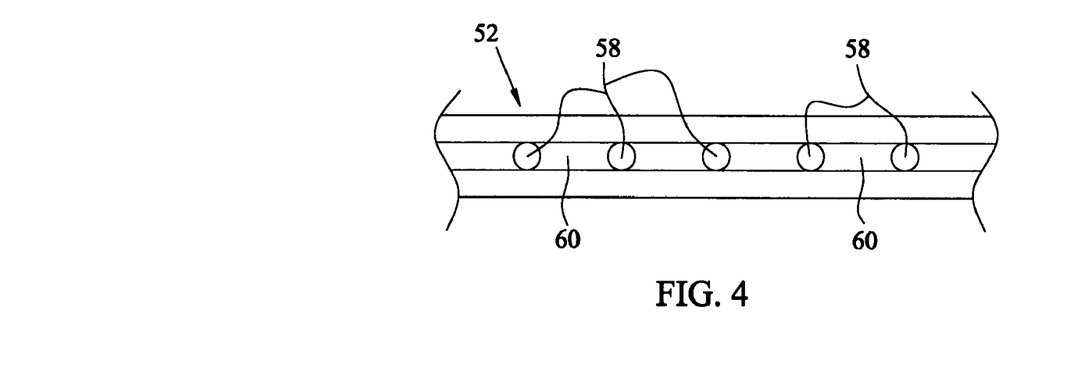
FIG. 4 is a schematic top view of a secondary track having appropriately spaced apart openings to engage guide horns of a main track.
Figure 5:
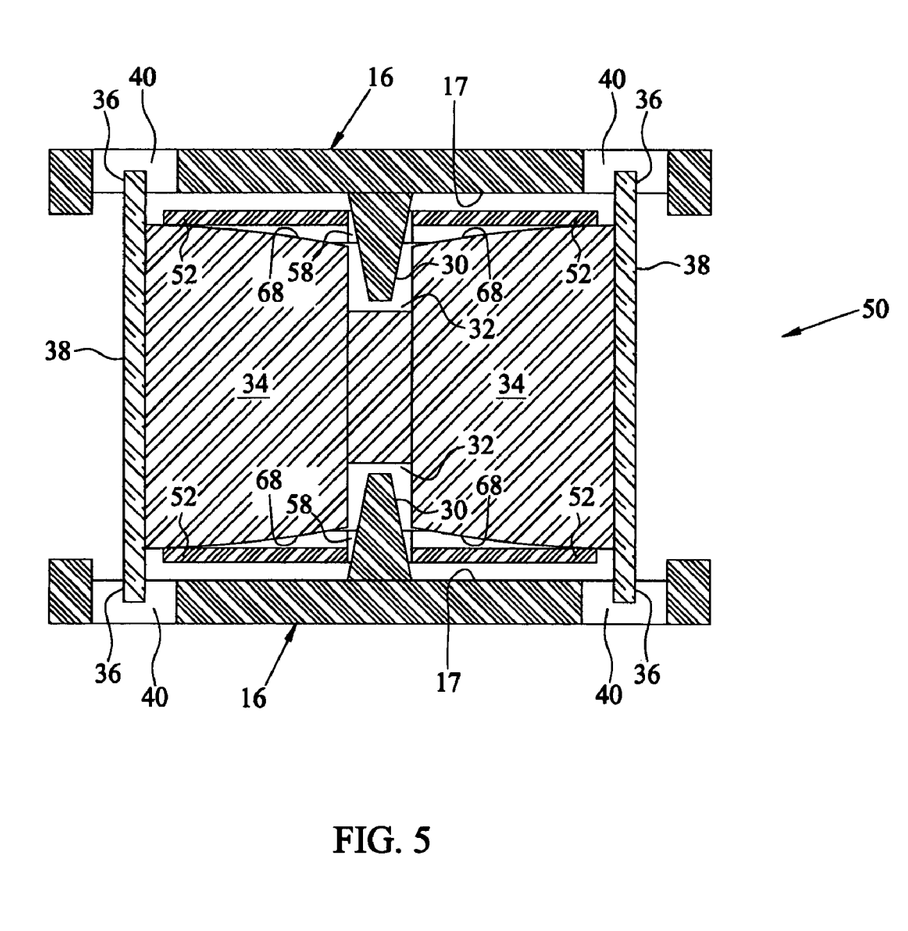
FIG. 5 is a schematic cross-sectional view of a rear-mounted main drive-sprocket taken generally along line 5—5 in FIG. 3 showing a secondary belt-drive track inside of the main track being frictionally engaged by the hub and by track center guide horns.

Referring to FIGS. 4 and 5, one arrangement that can be used for tandem drive system 50 has each secondary track 52 provided with longitudinally spaced-apart reinforced openings 58 in a reinforced center strip 60. Longitudinal spaced-apart openings 58 in strip 60 accommodate guide horns 30 of each main track 16. This accommodation allows each secondary track 52 to fit between drive sprockets 38 and ride next to inside face 17 of each main track 16 as tracks 16 and 52 are rotated by each main drive-sprocket assembly 20.

A hydraulic or mechanical belt-tensioning apparatus 62 can be mounted on each opposite lateral side 64 of tank 10 to contact or bear against each secondary track and selectably exert a pushing or tensioning force (shown by arrow 66) on each secondary track 52 when main track 16 separates and tandem drive system 50 is needed to propel tank 10. Tensioning force 66 tightens each secondary track 52 on or around each drive sprocket assembly 20 to frictionally engage annular outside surfaces 68 of each hub 34 of each main drive-sprocket assembly 20. (Annular outside surfaces 68 can be smooth, knurled or otherwise roughened as desired). This frictional engagement of each secondary track 52 and outside surfaces 68 of hubs 34 can transfer rotary power (shown as arrow 70 in FIG. 3) from internal propulsive machinery of tank 10 via each main drive-sprocket assembly 20 to each secondary track 52 to move tank 10 to the rear. Engagement of guide horns 30 of each main drive-sprocket assembly 20 and reinforced holes 58 of each secondary track 52 can augment this power transfer.

Figure 6:
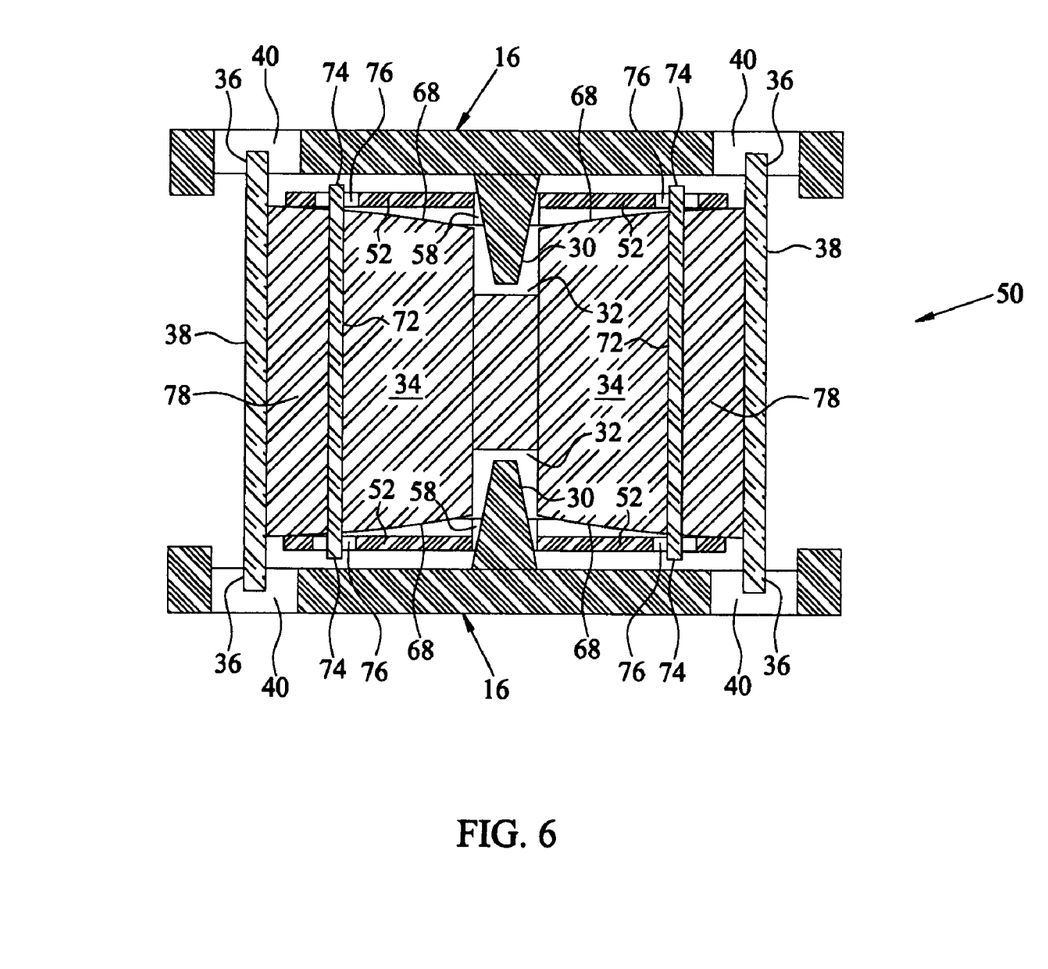
FIG. 6 is a schematic cross-sectional view of a rear-mounted main drive-sprocket taken generally along line 5—5 in FIG. 3 showing another secondary belt-drive track inside of the main track being engaged by gear teeth of secondary sprockets and by track center guide horns.

Referring to FIG. 6, another arrangement that can be used for tandem drive system 50 can have secondary sprockets 72 having annular gear teeth 74 extending from hub 34 on each rear-mounted main drive-sprocket assembly 20. Hub 34 can have an annular spacer structure 78 between secondary sprockets 72 and drive-sprockets 38 to help assure that teeth 74 can engage correspondingly longitudinally spaced-apart holes 76 in each secondary track 52. This engagement assures direct and positive connection between each drive sprocket assembly 20 and its associated secondary track 52 to transfer rotary power to move tank 10. Optionally, belt tensioning apparatus 62 can exert tensioning force 66 to further assure engagement between each secondary track 52 and teeth 74 of secondary sprockets 72 and frictional engagement between secondary track 52 and outside annular surfaces 68 on hub 34. Engagement of guide horns 30 and reinforced holes 58 of each secondary track 52 also can augment this power transfer.

Tandem drive system 50 also can have side ridges/side flanges 78 to captivate secondary tracks 52 onto roadwheels 18, idler wheels 24 and main idler wheel 26. Another propulsion linkage option is to have inwardly extending teeth 80 on the inside of each secondary track 52 (only three of which are shown on secondary track 52 in FIG. 3 by way of example). Teeth 80 are correspondingly spaced to engage spaces between sequential ones of teeth 74 on secondary sprockets 72 of each rear-mounted main drive-sprocket assembly 20. Aft series 56 of supporting roadwheels 18 can be provided with appropriate spaced apart slots 82 (only three of which are shown on one roadwheel 18 in FIG. 3 by way of example) to engage inwardly extending teeth 80 and transfer propulsive and maneuvering forces from each drive-sprocket assembly 20 via each secondary track 52.

In operation, when each main track 16 is intact, each secondary track 52 can free-ride or rotate on each drive-sprocket assembly 20 as each main track 16 powers tank 10 to progress overland. When either main track 16 is broken or separated by impacting or exploding ordnance or other means, and falls away, the inner secondary track 52 becomes free of the covering provided by its adjacent main track 16 to contact the ground. The exposed secondary track 52 can now transfer propulsive forces and provide mobility to tank 10. Secondary tracks 52 of tandem drive system 50 automatically become the main power transmitting surfaces for tank 10 to allow virtually continuous power transfer by rear-mounted main drive-sprocket assemblies 20 and provide propulsive power to tank 10 via secondary tracks 52 on aft series 56 of supporting roadwheels 28.

With the weight of tank 10 now resting on a now broken or separated track 16, tank 10 can be driven via each secondary track 52 to the rear. Since each secondary track 52 continuously extends around each rear-mounted main drive-sprocket assembly 20 in secondary closed endless loop 52A, the loose and damaged end of each separated main track 16 is kept from being pulled around and bunching up at sprocket assemblies 20 or from becoming piled-up behind tank 10. Each damaged main track 16 simply remains lying on ground 14 as it is rolled off each rear-mounted main drive-sprocket assembly 20 as tank 10 moves to the rear. Each secondary track 32 transfers propulsive power to maneuver tank 10 rearward and clear of the already cleared portion of an assault lane. Because of the functional secondary tracks 52 of tandem drive system 50, the cleared portion of the assault lane is kept clear of all major obstructions except for vehicle and track debris left-behind by the mine damaged vehicle.

Since secondary tracks 52 can be used to transport tank to the rear and away from a mined area, repair and reinstallation of damaged main track(s) can now proceed in a cleared area safely away from the assault lane. Secondary tracks 52 can also be relied upon to retrieve the damaged main track(s) when they are secured to and towed to a safe area by tank 10. Optionally, the damaged tank 10 can have one or both main tracks 16 replaced with new track(s) since secondary tracks 52 of tandem drive system 50 can maneuver tank 10 by its own propulsion system to a rapid repair depot where it can drive directly onto new main track(s).

Tandem drive system 50 of the invention allows a tracked vehicle such as tank 10 to continue to operate without binding either main track 16 at or around either rear-mounted main drive-sprocket assembly 20 if either main track 16 becomes separated during use. Tandem drive system 50 of the invention provides for redundant transfer of power for movement and maneuvering by redundantly powering the secondary track 52 around rear mounted main drive sprocket assemblies 20 and aft series 56 of supporting roadwheels 28. Tandem drive system 50 of the invention gives a tank crew the option of moving forward to drop off a broken main track if the main-track should become separated or broken and allows them to move aside should one or both main tracks 16 become damaged so as not to impede the progress of other vehicles following it. Another option for the tank crew is to allow them to jettison a damaged track while tank 10 remains in the safe track path that was behind tank 10 and was cleared of mines. Tandem drive system 50 allows a tracked vehicle to brake and or park safely park should both main tracks 16 become broken or while maintenance is being performed on main tracks 16.

Having the teachings of this invention in mind, modifications and alternate embodiments of tandem drive system 50 may be adapted without departing from the scope of the invention. Its uncomplicated, compact design that incorporates structures long proven to operate successfully lends itself to numerous modifications to permit its reliable use under the hostile and demanding conditions routinely encountered in active combat. Tandem drive system 50 can be fabricated in different physical arrangements from a wide variety of materials that have proven resistance to corrosion and have sufficient strength to provide long term reliable operation under a multitude of different operational conditions.

The disclosed components and their arrangements as disclosed herein, all contribute to the novel features of this invention. Tandem drive system 50 provides a reliable and capable means of keeping tracked vehicles capable of motion and maneuvering under the adverse conditions and terrain found on the battlefield. Therefore, tandem drive system 50, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A tandem drive system for a tracked vehicle having a main track longitudinally extending in a closed endless main loop on opposite sides and engaging a separate main drive sprocket assembly, extending under roadwheels to a main drive idler wheel, and back to said main drive-sprocket assembly in said main loop, each main track having an inboard face on an inward facing inner surface said tandem drive system comprising:

a secondary track engaging each main drive-sprocket assembly and extending forward along the tracked vehicle from each main drive-sprocket assembly under only an aft-most fractional portion of the roadwheels, each secondary track being configured as a closed endless secondary loop inside of said main loop of each main track, and each secondary track being adjacent to and laterally extending across the inboard face of a separate main track where said main and secondary tracks are wrapped around each main drive-sprocket assembly.

2. The system of claim 1 wherein each secondary track is shorter than each main track.

3. A tandem drive system for a tracked vehicle having a main track longitudinally extending in a closed endless main loop on opposite sides and engaging a separate main drive sprocket assembly, extending under roadwheels to a main drive idler wheel, and back to said main drive-sprocket assembly in said main loop, said tandem drive system comprising:

a secondary track engaging each main drive-sprocket assembly and extending forward along the tracked vehicle from each main drive-sprocket assembly under only an aft-most fractional portion of the roadwheels, said secondary track being configured as a closed endless secondary loop inside of and shorter than said main loop of each main track, wherein each main track is made of steel and has inwardly extending longitudinally spaced-apart guide horns, and each secondary track has a fiber reinforced flexible belt-like structure having longitudinally spaced-apart openings correspondingly spaced with respect to said guide horns.

4. The system of claim 3 comprising:

a tensioning apparatus mounted on each opposite lateral side of the tracked vehicle in contact with a separate secondary track to selectably exert a pushing, tensioning force on each secondary track; and a hub provided with annular outside surfaces on each main drive-sprocket assembly, said tensioning force exerted by said tensioning apparatus tightening each secondary track around each drive sprocket assembly.

5. The system of claim 4 wherein tightening of each secondary track around each drive sprocket assembly frictionally engages said annular outside surfaces of each hub of each main drive-sprocket assembly to transfer rotary power to move said secondary track and said tracked vehicle.

6. The system of claim 3 comprising:
   secondary sprockets having annular gear teeth extending from a hub on each rear-mounted main drive-sprocket assembly; and
   longitudinally spaced-apart holes in each secondary track, said spaced apart holes in each secondary track being correspondingly spaced apart with respect to said gear teeth.

7. The system of claim 6 wherein said gear teeth engage said spaced apart holes in each secondary track to transfer rotary power to move said secondary track and said tracked vehicle.

8. A tracked vehicle comprising:
   a main return idler wheel on opposite sides and at the front of a tracked vehicle;
   a main drive sprocket assembly on each of said opposite sides mounted at the rear of said tracked vehicle;
   roadwheels on each of said opposite sides, said roadwheels being spaced apart from one another and located along the bottom of said tracked vehicle;
   a main track longitudinally extending in a closed endless main loop on each of said opposite sides, each main track engaging a separate main drive sprocket assembly, extending to a separate main drive idler wheel, under said roadwheels, and back to said separate rear-mounted main drive-sprocket assembly in said main loop each main track having an inboard face on an inward facing inner surface; and
   a tandem drive system having a secondary track inside said main loop of each main track, each secondary track of said tandem drive system engaging a separate rear-mounted main drive-sprocket assembly, extending forward along the tracked vehicle from each main drive-sprocket assembly under said roadwheels, and defining a closed endless secondary loop inside of and shorter than said main loop, and each secondary track being adjacent to and laterally extending across the inboard face of a separate main track where the main and secondary tracks are wrapped around each main drive-sprocket assembly.

9. The vehicle of claim 8 wherein said secondary track extends forward under only an aft-most fractional portion of said roadwheels.

10. A tracked vehicle comprising:
    a main return idler wheel on opposite sides and at the front of a tracked vehicle;
    a main drive sprocket assembly on each of said opposite sides mounted at the rear of said tracked vehicle;
    roadwheels on each of said opposite sides, said roadwheels being spaced apart from one another and located along the bottom of said tracked vehicle;
    a main track longitudinally extending in a closed endless main loop on each of said opposite sides, each main track engaging a separate main drive sprocket assembly, extending to a separate main drive idler wheel, under said roadwheels, and back to said separate rear-mounted main drive-sprocket assembly in said main loop, each main track having an inboard face on an inward facing inner surface;
    a tandem drive system having a secondary track inside said main loop of each main track, each secondary track of said tandem drive system engaging a separate rear-mounted main drive-sprocket assembly, extending forward along the tracked vehicle from each main drive-sprocket assembly under said roadwheels, and defining a closed endless secondary loop inside of and shorter than said main loop,
    said secondary track extending forward under only an aft-most fractional portion of said roadwheels, and each secondary track being adjacent to and laterally extending across the inboard face of a separate main track where the main and secondary tracks are wrapped around each main drive-sprocket assembly wherein each main track is made of steel and has inwardly extending longitudinally spaced-apart guide horns, and each secondary track has a fiber reinforced flexible belt-like structure having longitudinally spaced-apart openings correspondingly spaced with respect to said guide horns.

11. The vehicle of claim 10 comprising:
    a tensioning apparatus mounted on each opposite lateral side of said tracked vehicle and in contact with a separate secondary track to selectably exert a pushing, tensioning force on each secondary track;
    a hub provided with annular outside surfaces on each main drive-sprocket assembly, said tensioning force exerted by said tensioning apparatus tightening each secondary track around each drive sprocket assembly.

12. The vehicle of claim 11 wherein tightening of each secondary track around each drive sprocket assembly frictionally engages said annular outside surfaces of each hub of each main drive-sprocket assembly to transfer rotary power to move said secondary track and said tracked vehicle.

13. The vehicle of claim 10 comprising:
    secondary sprockets having annular gear teeth extending from a hub on each rear-mounted main drive-sprocket assembly and;
    longitudinally spaced-apart holes in each secondary track, said spaced apart holes in each secondary track being correspondingly spaced apart with respect to said gear teeth.

14. The vehicle of claim 13 wherein said gear teeth engage said spaced apart holes in each secondary track to transfer rotary power to move said secondary track and said tracked vehicle.

15. A method of creating a tandem drive system for a tracked vehicle having a main track longitudinally extending in a closed endless main loop on opposite sides and engaging a separate main drive sprocket assembly, extending under roadwheels to a main drive idler wheel, and returning back to said main drive-sprocket assembly in said main loop, each main track having an inboard face on an inward facing inner surface said method comprising the steps of:
    engaging a secondary track by each main drive-sprocket assembly; extending said secondary track forward along the track vehicle from each main drive-sprocket assembly under only an aft-most fractional portion of the roadwheels; and
    configuring said secondary track as a closed endless secondary loop inside of and shorter than said main closed endless loop of each main track, each secondary track being adjacent to and laterally extending across the inboard face of a separate main track where said main and secondary tracks are wrapped around each main drive-sprocket assembly.

16. A method of creating a tandem drive system for a tracked vehicle having a main track longitudinally extending in a closed endless main loop on opposite sides and engaging a separate main drive sprocket assembly, extending under roadwheels to a main drive idler wheel, and returning back to said main drive-sprocket assembly in said main loop, said method comprising the steps of:

engaging a secondary track by each main drive-sprocket assembly;

extending said secondary track forward along the track vehicle from each main drive-sprocket assembly under only an aft-most fractional portion of the roadwheels;

configuring said secondary track as a closed endless secondary loop inside of and shorter than said main closed endless loop of each main track;

providing inwardly extending longitudinally spaced-apart guide horns on each main track; and forming each secondary track from fiber reinforced flexible belt-like structure having longitudinally spaced-apart openings correspondingly spaced with respect to said guide horns.

17. The method of claim 16 further comprising the steps of;

mounting a tensioning apparatus on each opposite lateral side of the tracked vehicle in contact with a separate secondary track to selectably exert a pushing, tensioning force on each secondary track: and tightening each secondary track on a hub provided with annular outside surfaces on each main drive-sprocket assembly by said tensioning force exerted by said tensioning apparatus.

18. The method of claim 17 further comprising the step of:

frictionally engaging said annular outside surfaces of each hub of each main drive-sprocket assembly by the step of tightening each secondary track around each drive sprocket assembly to transfer rotary power to move said secondary track and said tracked vehicle.

19. The method of claim 16 further comprising the steps of:

providing secondary sprockets having annular gear teeth extending from a hub on each rear-mounted main drive-sprocket assembly and;

providing longitudinally spaced-apart holes in each secondary track, said spaced apart holes in each secondary track being correspondingly spaced apart with respect to said gear teeth.

20. The method of claim 19 further comprising the steps of:

engaging said spaced apart holes in each secondary track by said gear teeth engage; and transferring rotary power via the engaged spaced apart holes and gear teeth to move said secondary track and said tracked vehicle.

* * * * *